United States Patent Office 3,395,143
Patented July 30, 1968

3,395,143
N - ARYLSUBSTITUTED ALKENONES AND ALKANOLS OF ARYLAMINO ALKANOLS
Kurt Thiele, Frankfurt am Main, and Klaus Posselt, Bergen-Enkheim, Germany, assignors to Deutsche Gold- und Silber-Scheideanstalt vormals Roessler, Frankfurt am Main, Germany
No Drawing. Filed Aug. 23, 1965, Ser. No. 481,901
Claims priority, application Germany, Aug. 29, 1964, D 45,305
10 Claims. (Cl. 260—240)

ABSTRACT OF THE DISCLOSURE

Compounds possessing action on the heart blood circulation of the formula:

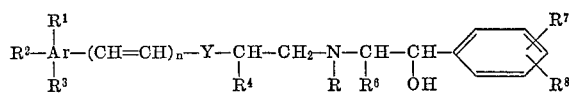

as well as their equivalent pharmaceutically acceptable salts, quaternary ammonium compounds and optically active isomers, wherein $R^1$, $R^2$ and $R^3$ each when taken individually are selected from the group consisting of hydrogen, halogen, alkyl, hydroxy, alkoxy, nitro, amino, dialkyl amino, acyl amino and trifluoromethyl, the alkyl of said alkyl, alkoxy and dialkyl amino groups preferably being lower alkyl, and the acyl of said acyl amino preferably being a lower alkanoic acid acyl, $R^1$ and $R^2$ when taken together are methylene dioxy and $R^1$ in addition can be

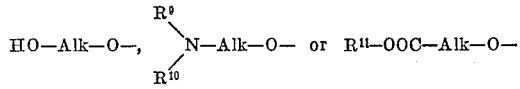

in which Alk is a straight or branched alkylene with 1 to 6 carbon atoms, each of $R^9$ and $R^{10}$ are hydrogen or lower alkyl groups when taken individually and when taken together are lower alkylene forming a 5 to 7 membered ring with the nitrogen atom and $R^{11}$ is lower alkyl, each of $R^4$, $R^5$ and $R^6$ are hydrogen or methyl, Ar is an aromatic radical which may contain a condensed ring system, such as, phenyl or naphthyl, which also may be partially or totally saturated, including mono and poly cyclic cycloalkyl compounds, Y is

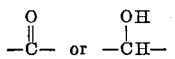

$R^7$ and $R^8$ each are hydrogen, halogen, alkyl hydroxy or methoxy and $n$ is an integer of from 1 to 3.

DETAILED DESCRIPTION OF THE INVENTION INCLUDING PREFERRED EMBODIMENTS

The present invention relates to novel pharmaceutically valuable compounds described above.

The novel compounds according to the invention possess a very marked action on the heart blood circulation. They are indicated for treatment of coronary spasms and for improving the coronary blood flow as evidenced by tests on the Langendorff guinea pig heart and the results of toxicological tests. The coronary dilating effect on guinea pig hearts is especially noteworthy. In a dosage range of 10–320 γ/heart (single injection) the compounds effect a marked increase in coronary blood flow of long lasting duration of, for example, 30 to 90 minutes. The compounds are of low toxicity. The $LD^{50}$ upon oral administration to mice is between 1.5 and 8 g./kg.

The compounds according to the invention can be produced by reacting a compound of the formula:

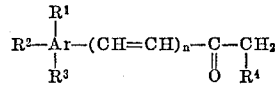

with a compound of the formula:

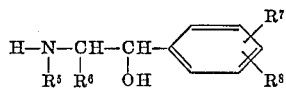

in the presence of formaldehyde or a compound yielding formaldehyde in an inert solvent such as alcohol, glacial acetic acid or dioxane, at the boiling point of the inert solvent or temperatures between about 80 and 120° C.

The conversion of the keto group into an alcohol group, if desired, can be effected with a reducing agent, such as, lithium aluminum hydride or sodium borohydride.

The compounds according to the invention contain optically active carbon atoms and usually are produced as racemates. The latter can be separated into the optically active isomers, for example, by reaction with an optically active acid and fractional crystallization. In many instances, however, it is possible to employ optically active compounds as the starting compounds.

The following examples will serve to illustrate the compounds according to the invention with reference to a number of representative specific embodiments thereof.

The symbol "—X" given in the structural formulae in a number of the examples signifies the radical

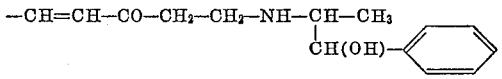

EXAMPLE 1

5-[3-phenyl-3-hydroxy-propyl-(2)-amino]-1-phenyl-penten-(1)-one-(3)

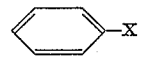

14.6 g. of benzal acetone, 18.7 g. of 1-norephedrine-HCl and 4 g. of paraformaldehyde were boiled under reflux with 75 ml. of isopropanol. After ½ hour, a further 1.5 g. of paraformaldehyde were added and the mixture boiled for a further hour. The mixture was then diluted with 200 cc. of acetone and upon cooling the HCl salt of the amino ketone precipitated. It was recrystallized from isopropanol. The melting point thereof was 181 to 183° C.

EXAMPLE 2

5-[3-phenyl-3-hydroxy-propyl-(2)-amino]-1-(4-methoxyphenyl)-penten-(1)-one-(3)

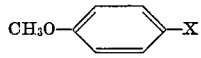

17.6 g. of anisal acetone, 18.7 g. of 1-norephedrine-HCl and 4 g. and 1.5 g. of paraformaldehyde were reacted in 75 ml. of isopropanol and processed as in Example 1. The HCl salt was recrystallized from methanol. The melting point thereof was 185–186° C.

EXAMPLE 3

5-[3-phenyl-3-hydroxy-propyl-(2)-amino]-1-(3,4-methylene dioxy phenyl)-penten-(1)-one-(3)

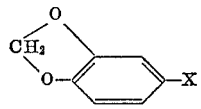

38 g. of piperonal acetone, 37.4 g. of 1-norephedrine-HCl and 8 g. of paraformaldehyde were boiled under reflux in 100 ml. of isopropanol for ½ hour. The reaction mixture was diluted with 200 ml. of acetone and cooled down. The HCl salt was recrystallized from 90% methanol. Its melting point was 198–199° C.

EXAMPLE 4

5-[3-phenyl-3-hydroxy-propyl-(2)-amino]-1-(3-nitrophenyl)-penten(1)-one-(3)

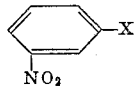

19.1 g. of m-nitrobenzene, 18.7 g. of 1-norephedrine-HCl and 4 g. of paraformaldehyde were boiled under reflux with 75 ml. of isopropanol on a water bath for 1 hour. The reaction mixture was diluted with 150 ml. of acetone and the HCl salt recrystallized from methanol. Its melting point was 202–204° C.

EXAMPLE 5

5-[3-phenyl-3-hydroxy-propyl-(2)-amino]-1-(4-chlorophenyl)-penten-(1)-one-(3)

14.5 g. of p-chlorobenzal acetone, 15.0 g. of 1-norephedrine-HCl and 3 g. of paraformaldehyde were refluxed with 100 ml. of isopropanol on a water bath for ½ hour. Then an additional 1.5 g. of paraformaldehyde were added and the mixture refluxed for a further hour. The reaction mixture was then diluted with 200 ml. of acetone and the HCl salt recrystallized from methanol. Its melting point was 191–192° C.

EXAMPLE 6

5-[3-phenyl-3-hydroxy-propyl-(2)-amino]-1-naphthyl-(1)-penten-(1)-one-(3)

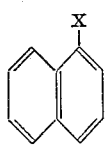

33 g. of α-naphthal acetone, 31.2 g. of 1-norephedrine-HCl and 6 g. plus 1.5 g. of paraformaldehyde were reacted in 150 ml. of isopropanol and processed in a manner analogous to that of Example 1. The HCl salt was recrystallized from glacial acetic acid. Its melting point was 185° C.

EXAMPLE 7

5-[3-phenyl-3-hydroxy-propyl-2-amino]-1-(3,4-dimethoxy phenyl)-penten-(1)-one-(3)

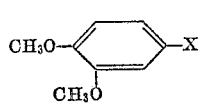

20.6 g. of 3,4-dimethoxy benzal acetone, 18.7 g. of 1-norephedrine-HCl and 4.5 g. of paraformaldehyde were refluxed in 75 ml. of isopropanol for 1 hour on a water bath. Then a further 1.5 g. of paraformaldehyde were added and the mixture refluxed for a further hour. The solvent was then distilled off and the residue dissolved in acetone with warming and the same volume of ethyl acetate then added. The HCl salt precipitated out in 3 days. It was recrystallized from methanol. Its melting point was 185–187° C.

EXAMPLE 8

5-[3-phenyl-3-hydroxy-propyl-2-amino]-1-[1,1,3-trimethyl cyclohexene-(2)-yl-(2)]-penten-(1)-one-(3)

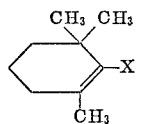

38.5 g. of β-ionone, 37.5 g. of 1-norephedrine-HCl and 6 g. plus 6 g. of paraformaldehyde in 150 ml. of isopropanol were reacted and processed analogously to Example 1. The HCl was recrystallized from isopropanol. Its melting point was 170° C.

EXAMPLE 9

5-[3-phenyl-3-hydroxy-propyl-(2)-amino]-1-(4-hydroxy-3-methoxy-phenyl)-penten-(1)-one-(3)

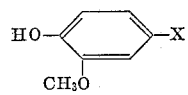

28.8 g. of vanillal acetone, 28 g. of 1-norephedrine-HCl and 4.5 g. of paraformaldehyde were refluxed in 150 ml. of isopropanol for 1 hour on a water bath. Then 3 further grams of paraformaldehyde were added and the mixture refluxed for another ½ hour. The reaction mixture was stirred into 200 ml. of ethyl acetate and the HCl salt recrystallized from ethanol. Its melting point was 182° C.

EXAMPLE 10

5-[3-phenyl-3-hydroxy-propyl-(2)-amino]-1-(3-methoxyphenyl)-penten-(1)-one-(3)

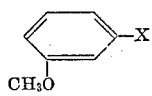

52.8 g. of m-methoxy benzal acetone, 56.2 g. of 1-norephedrine-HCl and 9 plus 9 g. of paraformaldehyde were reacted and processed analogously to Example 9. The HCl salt was recrystallized from isopropanol. Its melting point was 186° C.

EXAMPLE 11

5-[3-phenyl-3-hydroxy-propyl-(2)-amino]-1-(3-nitro-4-methoxy-phenyl)-penten-(1)-one-(3)

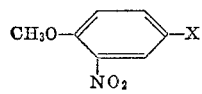

33 g. of 3-nitro-4-methoxy-benzal acetone, 28 g. of 1-norephedrine-HCl and 4.5 g. of paraformaldehyde were refluxed in 700 ml. of isopropanol on a water bath. After one hour another 4.5 g. of parafomaldehyde were added and the mixture refluxed for a further hour. The melting point of the HCl salt was 204° C.

EXAMPLE 12

5-[3-phenyl-3-hydroxy-propyl-(2)-amino]-1-(3-nitrophenyl)-3-hydroxy-penten-(1)

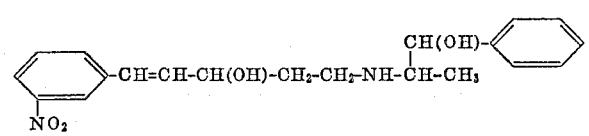

20 g. of 5-[3-phenyl-3-hydroxy-propyl-2-amino]-1(3-nitrophenyl)-penten-(1)-one-(3) were reduced into 6 g. of sodium borohydride in 350 ml. of ethanol at room temperature. After 1 hour the reaction mixture was decomposed with addition of 150 ml. of water. The solvent was then distilled off and the residue taken up in ether. The HCl salt was precipitated with ethanolic HCl and recrystallized from isopropanol. Its melting point was 147° C.

EXAMPLE 13

7-[3-phenyl-3-hydroxy-propyl-(2)-amino]-1-phenyl-heptadiene-(1,3)-one-(5)

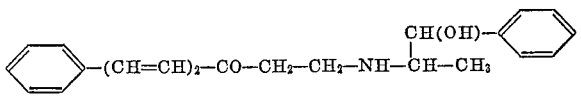

34.4 g. of cinnamylidene acetone, 37.5 g. of 1-norephedrine-HCl and 6 g. plus 3 g. of paraformaldehyde in 150 ml. of isopropanol were reacted and processed analogously to Example 1. The HCl salt was recrystillized from ethanol. 22 g. of the HCl salt of a melting point of 190° C. were obtained.

EXAMPLE 14

5-[3-phenyl-3-hydroxy-propyl-(2)-amino]-1-(4-hydroxy-phenyl)-penten-(1)-one-(3)

19 g. of p-acetoxy benzal acetone, 18.7 g. of 1-norephedrine-HCl and 3 g. plus 3 g. of paraformaldehyde in 75 ml. of isopropanol were reacted and processed analogously to Example 1. The HCl salt of the p-acetoxy compound was deacetylated by boiling for 1 hour in 90% ethanol with the addition of 1% of HCl. The solution was concentrated and the precipitated HCl salt recrystallized from ethanol. 11 g. of the product with a melting point of 198° C. were obtained.

EXAMPLE 15

5-[3-phenyl-3-hydroxy-propyl-(2)-amino]-1-(4-isopropyl-phenyl)-penten-(1)-one-(3)

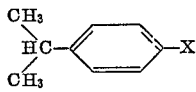

54 g. of isopropyl benzal acetone, 54 g. of 1-norephedrine-HCl and 6 g. plus 3 g. of paraformaldehyde in 150 ml. of isopropanol were reacted and processed analogously to Example 1. The HCl salt was recrystallized from isopropanol. 15 g. of the product with a melting point of 185° C. were obtained.

EXAMPLE 16

5-[3-phenyl-3-hydroxy-propyl-(2)-amino]-1-[3-nitro-4-hydroxy-phenyl]-penten-(1)-one-(3)

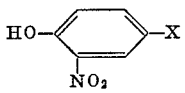

50 g. of 4-acetoxy-3-nitro-benzal-acetone, 37.5 g. of 1-norephedrine-HCl and 6 g. plus 6 g. of paraformaldehyde in 200 ml. of isopropanol were reacted analogously to Example 14 and the resulting acetoxy compound deacetylated in 300 ml. of 80% ethanol and 10 ml. conc. HCl. The HCl salt was recrystallized from ethanol. The yield of the product was 14 g. and its melting point was 188° C.

EXAMPLE 17

5-[3-phenyl-3-hydroxy-propyl-(2)-amino]-1-(4-carbethoxy-methoxy-phenyl)-penten-(1)-one-(3)

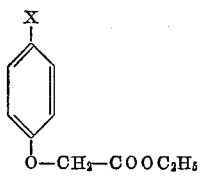

65 g. of p-carbethoxymethoxy benzal acetone, 49 g. of 1-norephedrine-HCl and 8 g. plus 8 g. of paraformaldehyde in 400 ml. of isopropanol were reacted analogously to Example 1. The HCl salt was recrystallized from ethanol. 25 g. of the product with a melting point of 188° C. were obtained.

EXAMPLE 18

5-[3-(4-hydroxy-phenyl)-3-hydroxy-propyl-(2)-amino]-1-(4-hydroxy-3-methoxy-phenyl)-penten-(1)-one-(3)

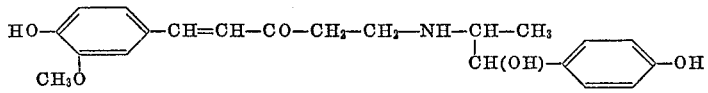

96 g. of 4-acetoxy-3-methoxy-benzal acetone, 83.5 g. of 1-p-hydroxynorephedrine-HCl and 12.3 g. plus 12.3 g. of paraformaldehyde in 1100 ml. of ethanol were reacted analogously to Example 14 and the acetoxy compound then deacetylated in 500 ml. of 90% ethanol and 20 ml. conc. HCl. The HCl salt was recrystallized from isopropanol. 42 g. of the product with a melting point of 196° C. were obtained.

EXAMPLE 19

5-[3-phenyl-3-hydroxy-propyl-(2)-amino]-1-(3-bromo-4-methoxy-phenyl)-penten-(1)-one-(3)

CH₃O—⟨phenyl⟩—X
         |
         Br

The HCl salt of this compound was produced analogously to Example 1 from 22 g. of m-bromoanisal acetone, 16.7 g. of 1-norephedrine-HCl and 5.4 g. of paraformaldehyde in 120 ml. of isopropanol and recrystallized from 90% ethanol. 9 g. of the product with a melting point of 195° C. were obtained.

EXAMPLE 20

5-[3-phenyl-3-hydroxy-propyl-2-amino]-1-[4-(3-dimethyl-aminopropoxy)-phenyl]-penten-(1)-one-(3)

X
|
⟨phenyl⟩
|
O—CH₂—CH₂—CH₂—N(CH₃)(CH₃)

The dihydrochloride of this compound was prepared analogously to Example 1 from 56 g. of 4-(3-dimethyl-aminopropoxy)-benzal acetone-HCl, 37 g. of 1-norephedrine-HCl and 12 g. of paraformaldehyde in 200 ml. of isopropanol and recrystallized from glacial acetic acid. Its melting point was 205° C.

EXAMPLE 21

5-[3-phenyl-3-hydroxy-propyl-(2)-amino]-1-(p-tolyl)-penten-(1)-one-(3)

CH₃—⟨phenyl⟩—X

The hydrochloride of this compound was prepared analogously to Example 1 from 32 g. of tolylidene acetone, 39 g. of 1-norephedrine-HCl and 6 g. plus 6 g. of paraformaldehyde in 150 ml. of isopropanol and recrystallized from methanol. 36 g. of the product with a melting point of 188° C. were obtained.

EXAMPLE 22

5-[3-phenyl-3-hydroxy-propyl-(2)-amino]-1-(4-chlorophenyl)-3-hydroxy-pentene-(1)

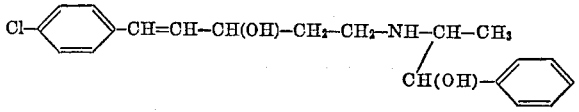

11 g. of 5-[phenyl-3-hydroxy-propyl-(2)-amino]-1-(4-chlorophenyl)-penten-(1)-one-(3)·HCl were suspended in 100 ml. of ethanol and reduced with a solution of 2 g. of sodium borohydride in 50 ml. of ethanol. After 1 hour 10 ml. of NaOH (10%) were added, the solvent distilled off and the residue taken up in ether. The hydrochloride was precipitated from the ether solution by addition of isopropanolic HCl and recrystallized from ethanol. 9 g. of the product with a melting point of 192° C. were obtained.

EXAMPLE 23

5-[3-phenyl-3-hydroxy-propyl-(2)-amino]-1-(4-methoxy-3-chlorophenyl)-penten-(1)-one-(3)

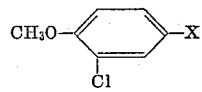

9 g. of m-chloroanisal acetone, 7.1 g. of 1-norephedrine-HCl and 1.1 g. plus 1.1 g. of paraformaldehyde in 120 ml. of isopropanol were reacted analogously to Example 1. The HCl salt was recrystallized from ethanol. 4 g. of the product with a melting point of 202° C. were obtained.

EXAMPLE 24

5-[3-phenyl-3-hydroxy-propyl-(2)-amino]-1-(4-acetaminophenyl)-penten-(1)-one-(3)

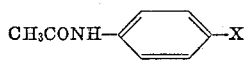

The hydrochloride of this compound was prepared analogously to Example 1 from 10 g. of p-acetamino benzal acetone, 9.2 g. of 1-norephedrine-HCl and 1.5 g. plus 1.5 g. of paraformaldehyde in 150 ml. of isopropanol and recrystallized from 90% ethanol. 8 g. of the product with a melting point of 218–219° C. were obtained.

EXAMPLE 25

5-[3-phenyl-3-hydroxy-propyl-(2)-amino]-1-(3-trifluoro-methyl-phenyl)-penten-(1)-one-(3)

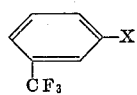

The hydrochloride of this compound was prepared analogously to Example 1 from 13.0 g. of m-trifluoromethyl benzal acetone, 11.4 g. of 1-norephedrine-HCl and 1.8 g. plus 1.8 g. of paraformaldehyde in 130 ml. of isopropanol and recrystallized from isopropanol. 6 g. of the product with a melting point of 192° C. were obtained.

EXAMPLE 26

5 - [3 - phenyl - 3 - hydroxy - propyl - (2) - amino] - 1 - {6.6 - dimethyl - bicyclo - [3,1,1] - heptene - (2) - yl-(2)} - penten - (1) - one - (3)

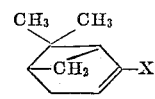

35 g. 1 - {6.6 - dimethyl-bicyclo-[3,1,1]-hepten-(2)-yl-(2)}-butene-(1)-one-(3), 34 g. of 1-norephedrine-HCl and 5.1 g.+5.1 g. of paraformaldehyde in 250 ml. of isopropanol were reacted analogously to Example 1. The hydrochloride was recrystallized from ethanol with addition of water. 22 g. of the product with a melting point of 224° C. were obtained.

We claim:
1. A compound of the formula

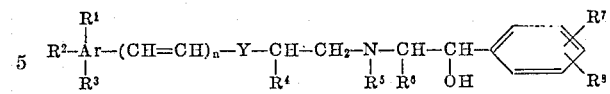

wherein $R^1$ and $R^2$ taken individually are each selected from the group consisting of hydrogen, chlorine, bromine, lower alkyl, hydroxyl, lower alkoxy, nitro, amino, diloweralkyl amino, acetylamino and trifluoro methyl and when taken together are methylene dioxy, $R^3$ is selected from the group consisting of hydrogen, chlorine, bromine, lower alkyl, hydroxyl, lower alkoxy, nitro, amino, di-lower amino, acetylamino, trifluoromethyl, HO—Alk—O—

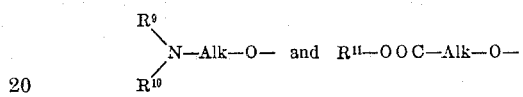

in which Alk is an alkylene group of 1–6 carbon atoms, $R^9$ and $R^{10}$ taken individually are each selected from the group consisting of hydrogen and lower alkyl and $R^{11}$ is lower alkyl, each of $R^4$, $R^5$ and $R^6$ are selected from the group consisting of hydrogen and methyl, Ar is selected from the group consisting of saturated, unsaturated and aromatic mono-nuclear and bi-nuclear condensed hydrocarbon radicals in which the individual rings have 4 to 6 carbon atoms, Y is selected from the group consisting of

and

each of $R^7$ and $R^8$ are selected from the group consisting of hydrogen, chlorine, bromine, lower alkyl, hydroxyl and methoxy and $n$ is an integer from 1 to 3.

2. The compound of claim 1 in which Ar is phenyl.
3. 5 - [3 - phenyl - 3 - hydroxy - propyl - (2) - amino] 1 - (3,4 - methylene dioxy phenyl) - penten - (1) - one-(3).
4. 5 - [3 - phenyl - 3 - hydroxy - propyl - (2) - amino] 1 - (3 - nitro - phenyl) - penten - (1) - one - (3).
5. 5 - [3 - phenyl - 3 - hydroxy - propyl - (2) - amino] 1 - (4 - chloro - phenyl) - penten - (1) - one - (3).
6. 5 - [3 - phenyl - 3 - hydroxy - propyl - (2) - amino] 1 - naphthyl - (1) - penten - (1) - one - (3).
7. 5 - [3 - phenyl - 3 - hydroxy - propyl - 2 - amino] - 1 - [1,1,3 - trimethyl cyclo - hexene - (2) - yl - (2)] - penten-(1) - one - (3).
8. 5 - [3 - phenyl - 3 - hydroxy - propyl - (2) - amino] 1 - (4 - hydroxy - phenyl) - penten - (1) - one - (3).
9. 5 - [3 - phenyl - 3 - hydroxy - propyl - (2) - amino] 1 - (4 - isopropyl - phenyl) - penten - (1) - one - (3).
10. 5 - [3 - phenyl - 3 - hydroxy - propyl - (2) - amino] 1 - {6,6 - dimethyl - bicyclo - [3,1,1] - heptene - (2) - yl-(2)} - penten - (1) - one - (3).

References Cited
UNITED STATES PATENTS

| 2,251,287 | 8/1941 | Lott | 260—340.5 |
| 3,211,792 | 10/1965 | Osbond et al. | 260—570.5 |
| 3,225,095 | 12/1965 | Thiele et al. | 260—570.5 |
| 3,337,626 | 8/1967 | Thiele et al. | 260—570.5 |

NICHOLAS S. RIZZO, *Primary Examiner.*

J. H. TURNIPSEED, *Assistant Examiner.*